(12) United States Patent
Yan et al.

(10) Patent No.: US 11,444,331 B2
(45) Date of Patent: Sep. 13, 2022

(54) BATTERY CELL AND ELECTRONIC DEVICE

(71) Applicant: NINGDE AMPEREX TECHNOLOGY LIMITED, Ningde (CN)

(72) Inventors: Dongyang Yan, Ningde (CN); Liangzhen Xiao, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 56 days.

(21) Appl. No.: 16/652,521

(22) PCT Filed: Jan. 21, 2020

(86) PCT No.: PCT/CN2020/073587
§ 371 (c)(1),
(2) Date: Sep. 3, 2020

(87) PCT Pub. No.: WO2020/173268
PCT Pub. Date: Sep. 3, 2020

(65) Prior Publication Data
US 2021/0218051 A1 Jul. 15, 2021

(30) Foreign Application Priority Data
Feb. 26, 2019 (CN) .......................... 201910143584.0

(51) Int. Cl.
*H01M 10/00* (2006.01)
*H01M 10/058* (2010.01)
(Continued)

(52) U.S. Cl.
CPC ..... *H01M 10/058* (2013.01); *H01M 10/0413* (2013.01); *H01M 10/0436* (2013.01); *H01M 50/183* (2021.01); *H01M 50/463* (2021.01)

(58) Field of Classification Search
CPC ........... H01M 10/058; H01M 10/0413; H01M 10/0436; H01M 50/183; H01M 50/463;
(Continued)

(56) References Cited

U.S. PATENT DOCUMENTS 9,225,034 B2 * 12/2015 Ryu .................. H01M 10/0436
9,685,679 B2    6/2017 Ryu et al.
(Continued)

FOREIGN PATENT DOCUMENTS

CN      105122535 A    12/2015
CN      105378968 A     3/2016
(Continued)

OTHER PUBLICATIONS

Machine translation of JP2005038613A "Plate-Shaped Battery", obtained Dec. 2021 (Year: 2005).*
(Continued)

*Primary Examiner* — Nicholas P D'Aniello
(74) *Attorney, Agent, or Firm* — Juan Carlos A. Marquez; Marquez IP Law Office, PLLC

(57) ABSTRACT

The present application relates to a battery cell and an electronic device. The battery cell according to an embodiment comprises: an electrode assembly, including an electrode plate; and a shell, receiving the electrode assembly and including a first edge seal, a second edge seal and a circular edge seal connecting the first edge seal and the second edge seal, wherein the circular edge seal defines a virtual circular arc region with a radius R and a radian angle Ø, wherein the electrode plate has a first edge, a second edge, and a third edge connecting the first edge and the second edge, and a virtual extension line of the first edge and a virtual extension line of the second edge intersect to form a virtual intersection point A; a point on the third edge has a minimum distance L relative to the virtual intersection point A; and the
(Continued)

virtual extension lines of the first edge and the second edge form a corner at the virtual intersection point A toward the third edge, and an angle of the corner is greater than 0 degrees and less than 180 degrees. The battery cell and the electronic device provided by the present application have higher safety performance, a higher space utilization ratio and a higher energy density.

14 Claims, 10 Drawing Sheets

(51) Int. Cl.
    *H01M 50/183*  (2021.01)
    *H01M 50/463*  (2021.01)
    *H01M 10/04*   (2006.01)
(58) Field of Classification Search
    CPC . H01M 50/102; H01M 10/0585; Y02P 70/50; Y02E 60/10
    See application file for complete search history.

(56) References Cited

U.S. PATENT DOCUMENTS

2016/0372783 A1* 12/2016 Min ................. H01M 10/0445
2017/0092923 A1   3/2017  Pasma et al.
2017/0141363 A1   5/2017  Kim et al.
2017/0149084 A1   5/2017  Park et al.
2018/0266690 A1  12/2018  Levin

FOREIGN PATENT DOCUMENTS

| | | |
|---|---|---|
| CN | 205646003 U | 10/2016 |
| CN | 107925118 A | 4/2018 |
| CN | 109873092 A | 6/2019 |
| JP | 2002260600 A | 9/2002 |
| JP | 2005038613 A | 2/2005 |
| JP | 2013134881 A | 7/2013 |
| JP | 2018142513 A | 9/2018 |
| WO | 2011027491 A1 | 3/2011 |

OTHER PUBLICATIONS

International Search Report dated Apr. 23, 2020 in counterpart PCT application PCT/CN/2020/073587, 4 pages in Chinese.
Written Opinion dated Apr. 23, 2020 in counterpart PCT application PCT/CN/2020/073587, 5 pages in Chinese.
Chinese First Office Action dated Mar. 3, 2020, in corresponding Chinese application 201910143584.0, 7 pages in Chinese.
Chinese Notification of Grant of Patent Right with Supplementary Search Report, dated Sep. 21, 2020 in counterpart Chinese application CN20191043584.0, 5 pages in Chinese.

* cited by examiner

BATTERY CELL AND ELECTRONIC DEVICE

The present application is a National Stage application of PCT international application: PCT/CN2020/073587 which claims the benefit of priority from the Chinese Patent Application No. 201910143584.0 filed on 26 Feb. 2019, the disclosure of which is hereby incorporated by reference in its entirety.

BACKGROUND

1. Technical Field

Embodiments of the present application relate to the field of batteries, and particularly to battery cells and electronic devices.

2. Description of the Related Art

Batteries have been widely used in various fields such as electronic products, electric vehicles and the like. However, during the actual use of the battery, there are many reasons that cause the battery shell to be recessed inward to touch the battery electrodes of the battery, such that the battery shell is affected by the battery electrodes to cause severe wear or even cracking, which causes electrochemical corrosion of the battery shell, thereby causing various types of potential safety hazards such as battery cracking, electrolyte leakage and the like.

Therefore, regarding how to improve the safety performance of batteries, there are still a lot of technical problems in the industry that need to be solved urgently.

SUMMARY

One of the objectives of the embodiments of the present application is to provide a battery cell and an electronic device, which can ensure a high space utilization ratio and energy density of a battery while improving safety performance of the battery.

A battery cell provided according to an embodiment of the present application includes: an electrode assembly, the electrode assembly including an electrode plate and a shell. The shell receives the electrode assembly and includes a first edge seal, a second edge seal, and a circular edge seal connecting the first edge seal and the second edge seal, wherein the circular edge seal defines a virtual circular arc region with a radius R and a radian angle Ø. The electrode plate has a first edge, a second edge, and a third edge connecting the first edge and the second edge, and a virtual extension line of the first edge and a virtual extension line of the second edge intersect to form a virtual intersection point A. A point on the third edge has a minimum distance L relative to the virtual intersection point A. The virtual extension line of the first edge and the virtual extension line of the second edge form a corner at the virtual intersection point A toward the third edge, and an angle of the corner is greater than 0 degrees and less than 180 degrees.

In some embodiments of the present application, the virtual intersection point A is located in the virtual circular arc region, and the minimum distance L is $$\sqrt[2]{(R-D1)^2 + (R-D2)^2},$$

wherein D1 is a vertical distance from the first edge to the first edge seal, and D2 is a vertical distance from the second edge to the second edge seal.

In some embodiments of the present application, the virtual intersection point A is located outside the virtual circular arc region, a vertical distance from the first edge to the first edge seal is D1, and a vertical distance from the second edge to the second edge seal is D2. A minimum distance from the virtual intersection point A to the third edge is L2, and L2 is equal to the smaller one of D1 and D2.

In some embodiments of the present application, the third edge includes a circular arc, a straight line or an irregular curve.

In some embodiments of the present application, the third edge is a circular arc with a radius greater than R, and the third edge is convex toward the circular edge seal.

In some embodiments of the present application, an angle of the radian angle Ø is greater than or equal to 0 degrees and less than or equal to 180 degrees.

In some embodiments of the present application, an angle of the radian angle Ø is greater than or equal to 0 degrees and less than or equal to 90 degrees.

In some embodiments of the present application, the electrode plate includes a first electrode plate and a second electrode plate. A separator is disposed between the first electrode plate and the second electrode plate.

In some embodiments of the present application, the separator is configured to fit a shape of the electrode plate, and the separator extends beyond edges of the electrode plate.

In some embodiments of the present application, the shell includes a first surface and a second surface opposite the first surface, and the first surface nears the first edge seal, the second edge seal and the circular edge seal relative to the second surface, wherein an area of the first electrode plate projected on the first surface is greater than an area of the second electrode plate projected on the first surface, wherein the first electrode plate nears the first surface relative to the second electrode plate.

An electronic device provided according to another embodiment of the present application includes a battery cell. The battery cell includes: an electrode assembly, the electrode assembly including an electrode plate and a shell. The shell receives the electrode assembly and includes a first edge seal, a second edge seal, and a circular edge seal connecting the first edge seal and the second edge seal, wherein the circular edge seal defines a virtual circular arc region with a radius R and a radian angle Ø. The electrode plate has a first edge, a second edge, and a third edge connecting the first edge and the second edge, and a virtual extension line of the first edge and a virtual extension line of the second edge intersect to form a virtual intersection point A. A point on the third edge has a minimum distance L relative to the virtual intersection point A. The virtual extension line of the first edge and the virtual extension line of the second edge form a corner at the virtual intersection point A toward the third edge, and an angle of the corner is greater than 0 degrees and less than 180 degrees.

The battery cell and the electronic device provided by the embodiments of the present application can ensure a high space utilization ratio and energy density while having high safety performance.

BRIEF DESCRIPTION OF THE DRAWINGS

To describe the embodiments of the present application, the following briefly describes the accompanying drawings required for describing the embodiments of the present application or the existing technologies. Obviously, the accompanying drawings described below only show some embodiments of the present application. For persons skilled in the art, the drawings of other embodiments can still be obtained according to the structures illustrated in the drawings without any creative effort.

DETAILED DESCRIPTION

Figure 1:
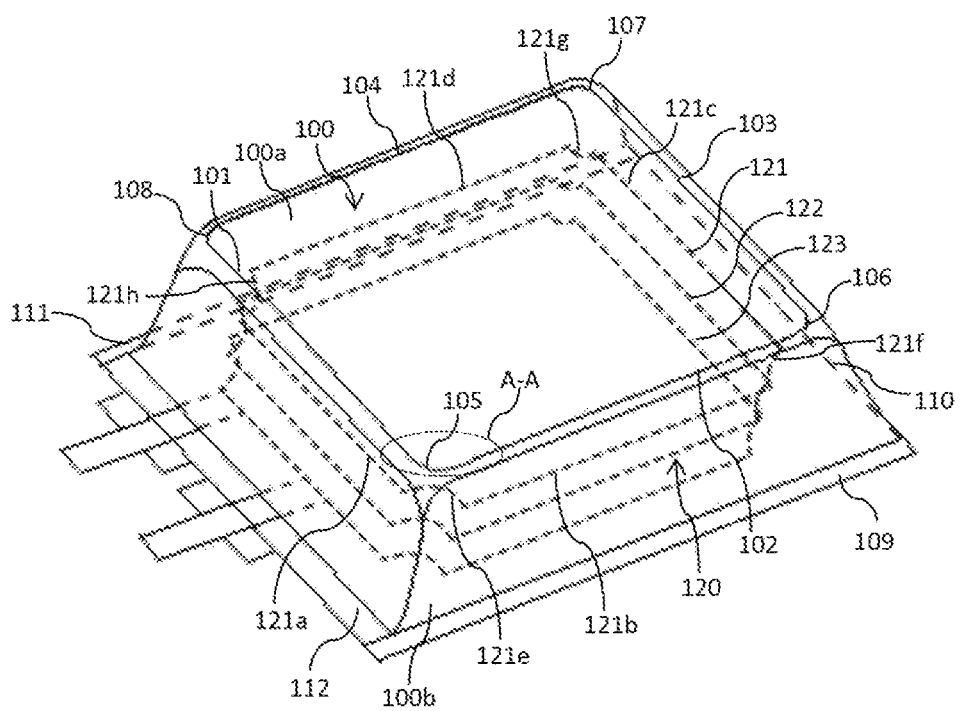
FIG. 1 shows a structural schematic diagram of a battery cell according to an embodiment of the present application.

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be construed as limiting the present application.

In this specification, unless specifically specified or defined, relative terms such as: "central", "longitudinal", "lateral", "front", "rear", "right", "left", "inner", "outer", "low", "high", "horizontal", "vertical", "higher", "lower", "above", "below", "top", "bottom", and their derivative terms (such as "horizontally", "downward", "upward", and the like) should be interpreted as referring to directions described in the discussion or shown in the accompanying drawings.

These relativistic wordings are merely used for ease of description, and do not require constructing or operating the present application in a specific direction.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two numerical values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "about" the same.

Further, to facilitate description, "first", "second", "third", and the like may be used in the present application to distinguish among different components in a diagram or a series of diagrams. The wordings "first", "second", "third", and the like are not intended to describe corresponding components.

In this specification, unless otherwise particularly indicated or limited, wordings such as "dispose", "connect", "couple", "fix", and similar wordings thereof are widely used, and a person skilled in the art may understand, based on a specific case, the foregoing wordings as, for example, fixedly connected, detachably connected, or integrally connected, or may be mechanically connected or electronically connected, or may be directly connected or indirectly connected by using an intermediate structure; or may be internal communication between two components.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In order to prevent the battery from being affected by the battery electrode to cause severe wear or even cracking during use, a distance or gap between the battery electrode and the shell may be increased to prevent the shell from being affected by the battery electrode. However, the energy density and space utilization ratio of the battery are one of the important indicators for measuring battery performance. Design of increasing the distance or gap between the battery electrode and the shell will lose the energy density of the battery and reduce the space utilization ratio of the battery. Therefore, such a design scheme is not optimal.

In view of the above, embodiments of the present application provide a battery cell, which prevents the shell from being severely affected by the battery electrode during use by the special design of the shape of the battery electrode and the positional relationship between the battery electrode and the shell, thereby reducing and even eliminating the potential safety hazards caused by the electrochemical corrosion of the shell due to the electrical conduction between the battery electrode and the shell while ensuring the high space utilization ratio and energy density of the battery.

Figure 2:
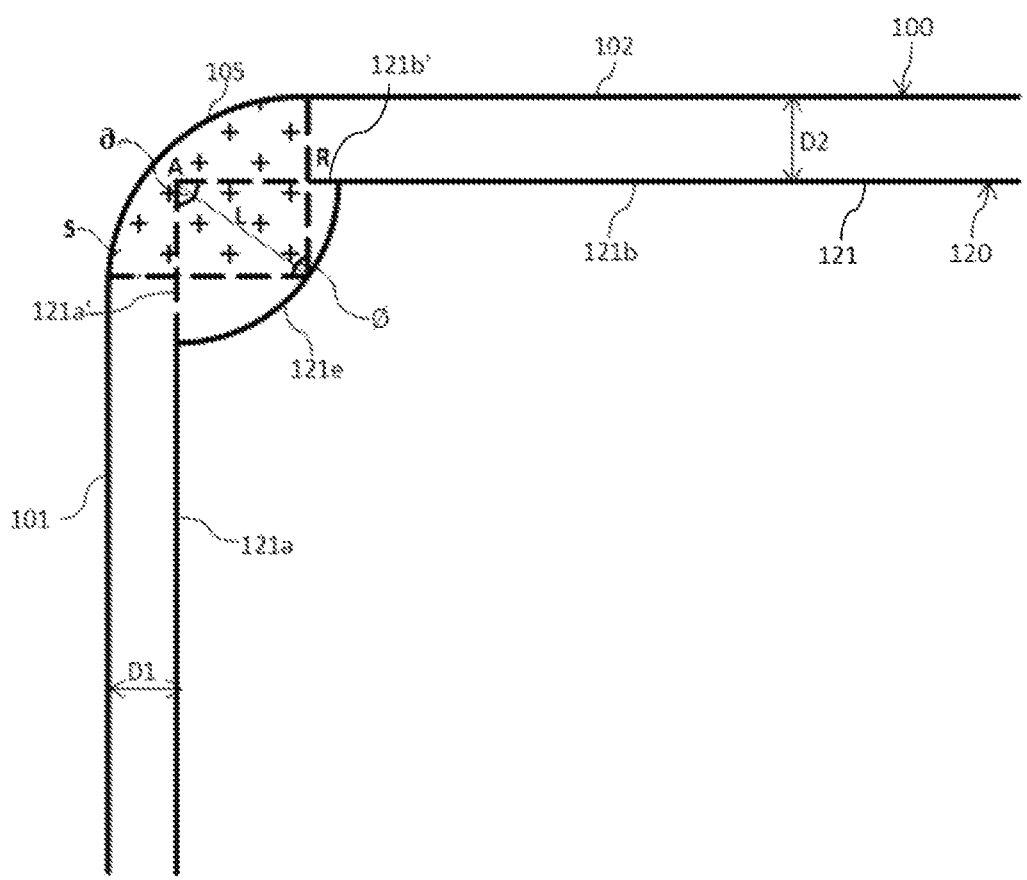
FIG. 2 shows a partial top schematic diagram of part A-A of the battery cell shown in FIG. 1.

FIG. 1 shows a structural schematic diagram of a battery cell 10 according to an embodiment of the present application. FIG. 2 shows a partial top schematic diagram of part A-A of the battery cell 10 shown in FIG. 1. As shown in FIG. 1 and FIG. 2, the battery cell 10 according to an embodiment of the present application includes: a shell 100 and an electrode assembly 120. The shell 100 receives the electrode assembly 120.

The shell 100 includes a first surface 100a and a second surface 100b opposite to the first surface 100a; a first edge seal 101, a second edge seal 102, a third edge seal 103, and a fourth edge seal 104 that are located on the first surface 100a; and a fifth edge seal 105 connecting the first edge seal 101 and the second edge seal 102, a sixth edge seal 106 connecting the second edge seal 102 and the third edge seal 103, a seventh edge seal 107 connecting the third edge seal 103 and the fourth edge seal 104, and an eighth edge seal 108 connecting the fourth edge seal 104 and the first edge seal 101, that are located on the first surface 100a. The fifth edge seal 105 is a circular arc with a radius R, and defines a virtual circular arc region S with the radius R and a radian angle Ø=90 degrees. The sixth edge seal 106, the seventh edge seal 107, and the eighth edge seal 108 have the same size and shape as the fifth edge seal 105. In other embodiments of the present application, one or more of the fifth edge seal 105, the sixth edge seal 106, the seventh edge seal 107, and the eighth edge seal 108 may have different sizes and shapes.

The shell 100 also includes an edge seal 109, an edge seal 110, an edge seal 111, and an edge seal 112 that are located on the second surface 100b, wherein the edge seal 109, the edge seal 111, and the edge seal 112 are sealed by thermal bonding. In other embodiments of the present application, the edge seal 109, the edge seal 111, and the edge seal 112 are sealed by a colloid or any suitable connection manner.

The shell 100 is an aluminum-plastic film. In another embodiment of the present application, the shell 100 is any suitable battery shell material. In still another embodiment of the present application, the shell 100 is any suitable soft pack battery shell material.

Before sealing the edge seal 109, the edge seal 111, and the edge seal 112 of the shell 100, the shell 100 is firstly subjected to a punch process such that the shell 100 has an inner space to receive the electrode assembly 120. At the same time, the fifth edge seal 105 with the radius R is formed by the punch process. Persons skilled in the art may set specific values of the radius R and the radian angle Ø of the fifth edge seal 105, the sixth edge seal 106, the seventh edge seal 107, and the eighth edge seal 108 respectively according to the specific size and/or shape of the shell 100 and/or the electrode assembly 120. For example, the angle of the radian angle Ø is greater than or equal to 0 degrees and less than or equal to 180 degrees, or greater than or equal to 0 degrees and less than or equal to 90 degrees.

The electrode assembly 120 includes a first electrode plate 121, a second electrode plate 122, and a third electrode plate 123. In other embodiments of the present application, the electrode assembly 120 includes any number of electrode plates. Materials of the first electrode plate 121, the second electrode plate 122, and the third electrode plate 123 are electrode materials commonly used in the art. Isolation films (not shown in the drawings) are disposed between the first electrode plate 121, the second electrode plate 122, and the third electrode plate 123. The isolation films are configured to fit the shapes of the first electrode plate 121, the second electrode plate 122, and the third electrode plate 123, and extend beyond edges of the first electrode plate 121, the second electrode plate 122, and the third electrode plate 123. A material of the isolation film is a isolation film material commonly used in the art, such as, but not limited to, polyterephthalic acid and polypropylene.

The first electrode plate 121, the second electrode plate 122 and the third electrode plate 123 have the same shape and size. In another embodiment of the present application, the first electrode plate 121, the second electrode plate 122, and the third electrode plate 123 have different shapes and sizes. In still another embodiment of the present application, an area of the first electrode plate 121 on the first surface 100a is greater than an area of the second electrode plate 122 and the third electrode plate 123 on the first surface 100a. In other embodiments of the present application, an area of the first electrode plate 121 on the first surface 100a is less than or equal to an area of the second electrode plate 122 and the third electrode plate 123 on the first surface 100a.

The shape of the electrode plate of the electrode assembly 120 in the embodiment shown in FIG. 1 is described below by taking the first electrode plate 121 as an example. The first electrode plate 121 has a first edge 121a, a second edge 121b, a third edge 121c, a fourth edge 121d, a fifth edge 121e connecting the first edge 121a and the second edge 121b, a sixth edge 121f connecting the second edge 121b and the third edge 121c, a seventh edge 121g connecting the third edge 121c and the fourth edge 121d, and an eighth edge 121h connecting the fourth edge 121d and the first edge 121a. The sixth edge 121f, the seventh edge 121g, and the eighth edge 121h have the same shape and size as the fifth edge 121e. The fifth edge 121e, the sixth edge 121f, the seventh edge 121g, and the eighth edge 121h are each in a circular arc shape. In other embodiments of the present application, one or more of the sixth edge 121f, the seventh edge 121g, and the eighth edge 121h may have the same configuration as the fifth edge 121e.

Since the fifth edge seal 105, the sixth edge seal 106, the seventh edge seal 107, and the eighth edge seal 108 of the shell 100 that are located on the first surface 100a are most easily recessed inward to touch the first electrode plate 121 during actual use of the battery cell 10, the embodiment of the present application prevents the fifth edge seal 105, the sixth edge seal 106, the seventh edge seal 107, and the eighth edge seal 108 of the shell 100 from touching the first electrode plate 121 during use of the battery cell 10 and thus prevents the shell 100 from being severely affected by the first electrode plate 121 by the special design of the shape of the first electrode plate 121 and the positional relationship between the first electrode plate 121 and the fifth edge seal 105, the sixth edge seal 106, the seventh edge seal 107, as well as the eighth edge seal 108.

Here, the part where the fifth edge 121e of the first electrode plate 121 is located, that is, the part circled by line A-A in FIG. 1, is taken as an example to describes the shape of the fifth edge 121e of the first electrode plate 121 of the battery cell 10 shown in FIG. 1 and the positional relationship between the fifth edge 121e of the first electrode plate 121 and the fifth edge seal 105.

Referring to FIG. 2, the fifth edge seal 105 defines the virtual circular arc region S with the radius R and the radian angle Ø=90 degrees. The first edge 121a of the first electrode plate 121 has a virtual extension line 121a', the second edge 121b of the first electrode plate 121 has a virtual extension line 121b', the virtual extension line 121a' and the virtual extension line 121b' intersect to form a virtual intersection point A, and the virtual intersection point A is located in the virtual circular arc region S. The virtual extension line 121a' of the first edge 121a and the virtual extension line 121b' of the second edge 121b form a corner ∂ at the virtual intersection point A toward the fifth edge 121e, and the corner ∂=90 degrees. In other embodiments of the present application, the angle of the corner ∂ is greater than 0 degrees and less than 180 degrees. The fifth edge 121e is a circular arc, a point on the fifth edge 121e has a minimum distance L relative to the virtual intersection point A, and the minimum distance L is $$\sqrt[2]{(R-D1)^2 + (R-D2)^2},$$

wherein D1 is a vertical distance from the first edge 121a of the first electrode plate 121 of the electrode assembly 120 to the first edge seal 101 of the shell 100, and D2 is a vertical distance from the first edge 121b of the first electrode plate 121 of the electrode assembly 120 to the second edge seal 102 of the shell 100.

If the shape of the first electrode plate 121 is not specially designed here, when the fifth edge seal 105 is recessed inward, the fifth edge seal may easily touch the intersection point A of the first electrode plate 121 located in the virtual circular arc region S such that the fifth edge seal 105 is punctured by the sharpest intersection point A. In order to prevent the fifth edge seal 105 from touching the sharpest position of the first electrode plate 121 when being recessed inward, a manner of increasing a distance or gap between the intersection point A of the first electrode plate 121 and the fifth edge seal 105 may be adopted to avoid the touching between the intersection point A of the first electrode plate 121 and the fifth edge seal 105, but this manner undoubtedly reduces the space utilization ratio and energy density of the battery cell 10. According to the embodiment shown in the FIG. 1 of the present application, the sharpest part at the intersection point A of the first electrode plate 121 is removed to form the inwardly recessed fifth edge 121e, thereby eliminating the risk of the fifth edge seal 105 being punctured by the first electrode plate 121 when being recessed inward. Moreover, the point on the fifth edge 121e has the minimum distance $$L = \sqrt[2]{(R-D1)^2 + (R-D2)^2}$$

relative to the virtual intersection point A, so that even if the fifth edge seal 105 of the shell 100 is recessed inward by a distance of the radius R to the maximum extent, the fifth edge seal 105 only just touches the fifth edge 121e, thereby eliminating the risk of electrochemical corrosion caused by the fifth edge seal 105 of the shell 100 being subjected to a large degree of wear due to the fifth edge 121e. In addition, even if the range of the minimum distance L is greater than 0 and less than $$\sqrt[2]{(R-D1)^2 + (R-D2)^2},$$

since the fifth edge 121e of the first electrode plate 121 is in a circular arc shape recessed inward, even if the fifth edge seal 105 touches the fifth edge 121e when being recessed inward, the fifth edge seal will not be punctured by the first electrode plate 121, and due to the circular arc shape of the fifth edge 121e, the degree of wear of the fifth edge seal 105 of the shell 100 and the fifth edge 121e is also significantly reduced, thereby reducing the risk of electrochemical corrosion of the fifth edge seal 105 of the shell 100.

Figure 3:
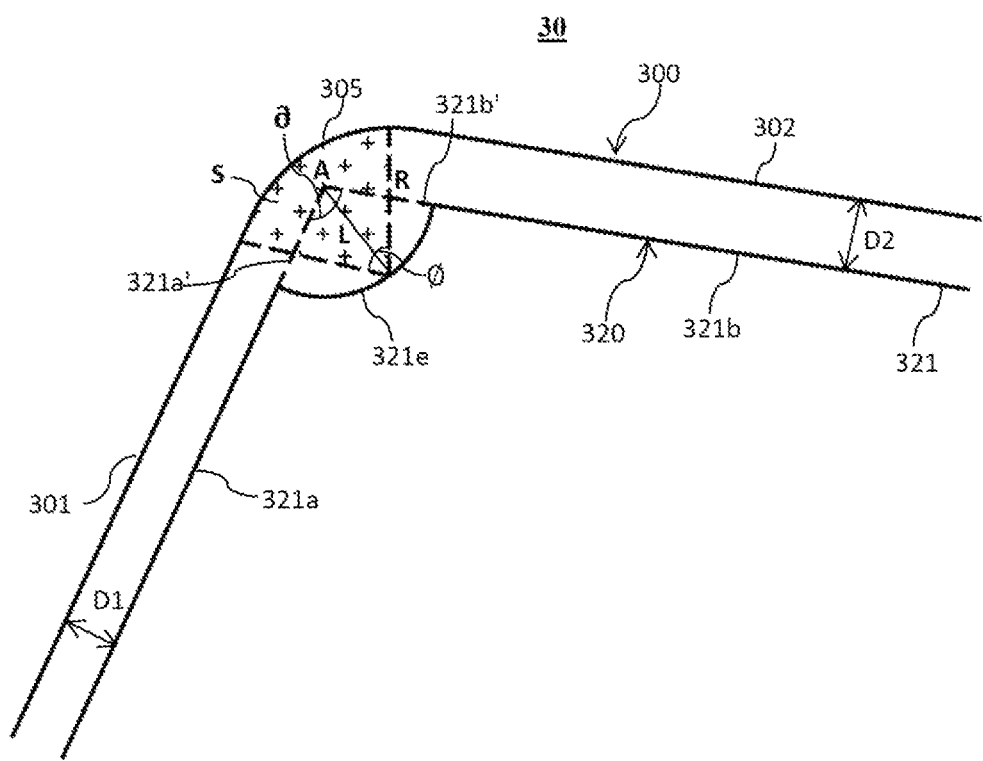
FIG. 3 shows a partial top schematic diagram of a battery cell according to another embodiment of the present application, wherein the position of the part shown in the partial top schematic diagram in the battery cell shown in FIG. 3 is the same as the position of part A-A in FIG. 1.

FIG. 3 shows a partial top schematic diagram of a battery cell 30 according to another embodiment of the present application, wherein the position of the part shown in the partial top schematic diagram in the battery cell 30 shown in FIG. 3 is the same as the position of part A-A in FIG. 1. It should be noted that for the sake of simplicity, the complete structural schematic diagram of the battery cell 30 of FIG. 3 is not shown. However, persons skilled in the art may understand that the battery cell 30 of FIG. 3 not shown may have the same composition as the battery cell 10 of FIG. 1.

A fifth edge seal 305 of a shell 300 is a circular arc with a radius R, and defines a virtual circular arc region S with a radius R and a radian angle Ø=60 degrees. A first edge 321a of a first electrode plate 321 has a virtual extension line 321a', a second edge 321b of the first electrode plate 321 has a virtual extension line 321b', the virtual extension line 321a' and the virtual extension line 321b' intersect to form a virtual intersection point A, and the virtual intersection point A is located in the virtual circular arc region S. The virtual extension line 321a' of the first edge 321a and the virtual extension line 321b' of the second edge 321b form a corner ∂ at the virtual intersection point A toward a fifth edge 321e of the first electrode plate 321, and the corner ∂=120 degrees. In other embodiments of the present application, the angle of the corner ∂ is greater than 0 degrees and less than 180 degrees. The fifth edge 321e is a circular arc, a point on the fifth edge 321e has a minimum distance L relative to the virtual intersection point A, and the minimum distance L is $$\sqrt[2]{(R-D1)^2 + (R-D2)^2},$$

wherein D1 is a vertical distance from the first edge 321a of the first electrode plate 321 of an electrode assembly 320 to a first edge seal 301 of the shell 300, and D2 is a vertical distance from the first edge 321b of the first electrode plate 321 of the electrode assembly 320 to a second edge seal 302 of the shell 300.

If the shape of the first electrode plate 321 is not specially designed here, when the fifth edge seal 305 is recessed inward, the fifth edge seal may easily touch the intersection point A of the first electrode plate 321 located in the virtual circular arc region S such that the fifth edge seal 305 is punctured by the sharpest intersection point A. In order to prevent the fifth edge seal 305 from touching the sharpest position of the first electrode plate 321 when being recessed inward, a manner of increasing a distance or gap between the intersection point A of the first electrode plate 321 and the fifth edge seal 305 may be adopted to avoid the touch between the intersection point A of the first electrode plate 321 and the fifth edge seal 305, but this undoubtedly reduces the space utilization ratio and energy density of the battery cell 30. According to the embodiment shown in the FIG. 3 of the present application, the sharpest part at the intersection point A of the first electrode plate 321 is removed to form the inwardly recessed fifth edge 321e, thereby eliminating the risk of the fifth edge seal 305 being punctured by the first electrode plate 321 when being recessed inward. Moreover, the point on the fifth edge 321e has the minimum distance $$L = \sqrt[2]{(R-D1)^2 + (R-D2)^2}$$

relative to the virtual intersection point A, so that even if the fifth edge seal 305 of the shell 300 is recessed inward by a distance of the radius R to the maximum extent, the fifth edge seal 305 only just touches the fifth edge 321e, thereby eliminating the risk of electrochemical corrosion caused by the fifth edge seal 305 of the shell 300 being subjected to a large degree of wear due to the fifth edge 321e. In addition, even if the range of the minimum distance L is greater than 0 and less than $$\sqrt[2]{(R-D1)^2 + (R-D2)^2},$$

since the fifth edge 321e of the first electrode plate 321 is in a circular arc shape recessed inward, even if the fifth edge seal 305 touches the fifth edge 321e when being recessed inward, the fifth edge seal will not be punctured by the first electrode plate 321, and due to the circular arc shape of the fifth edge 321e, the degree of wear of the fifth edge seal 305 of the shell 300 and the fifth edge 321e is also significantly reduced, thereby reducing the risk of electrochemical corrosion of the fifth edge seal 305 of the shell 300.

Figure 4:
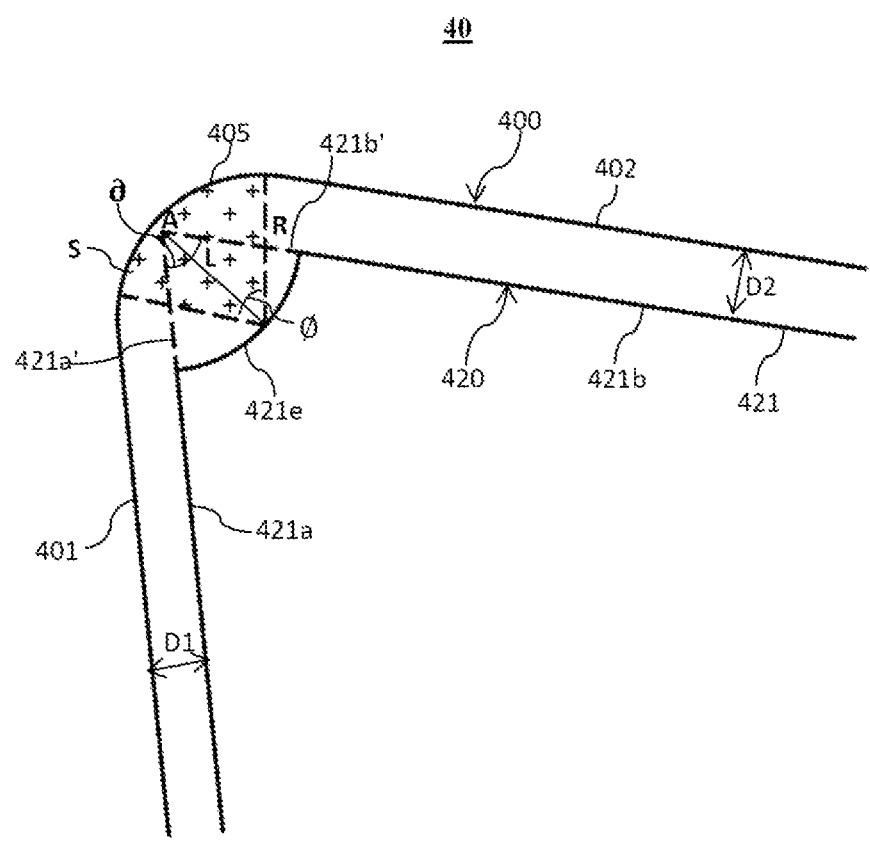
FIG. 4 shows a partial top schematic diagram of a battery cell according to still another embodiment of the present application, wherein the position of the part shown in the partial top schematic diagram in the battery cell shown in FIG. 4 is the same as the position of part A-A in FIG. 1.

FIG. 4 shows a partial top schematic diagram of a battery cell 40 according to still another embodiment of the present application, wherein the position of the part shown in the partial top schematic diagram in the battery cell 40 shown in FIG. 4 is the same as the position of part A-A in FIG. 1. It should be noted that for the sake of simplicity, the complete structural schematic diagram of the battery cell 40 of FIG. 4 is not shown. However, persons skilled in the art may understand that the battery cell 40 of FIG. 4 not shown may have the same composition as the battery cell 10 of FIG. 1.

A fifth edge seal 405 of a shell 400 is a circular arc with a radius R, and defines a virtual circular arc region S with a radius R and a radian angle Ø=60 degrees. A first edge 421a of a first electrode plate 421 has a virtual extension line 421a', a second edge 421b of the first electrode plate 421 has a virtual extension line 421b', the virtual extension line 421a' and the virtual extension line 421b' intersect to form a virtual intersection point A, and the virtual intersection point A is located in the virtual circular arc region S. The virtual extension line 421a' of the first edge 421a and the virtual extension line 421b' of the second edge 421b form a corner ∂ at the virtual intersection point A toward a fifth edge 421e of the first electrode plate 421, and the corner ∂=60 degrees. In other embodiments of the present application, the angle of the corner ∂ is greater than 0 degrees and less than 180 degrees. The fifth edge 421e is a circular arc, a point on the fifth edge 421e has a minimum distance L relative to the virtual intersection point A, and the minimum distance L is $$\sqrt[2]{(R-D1)^2 + (R-D2)^2},$$

wherein D1 is a vertical distance from the first edge 421a of the first electrode plate 421 of an electrode assembly 420 to a first edge seal 401 of the shell 400, and D2 is a vertical distance from the first edge 421b of the first electrode plate 421 of the electrode assembly 420 to a second edge seal 402 of the shell 400.

If the shape of the first electrode plate 421 is not specially designed here, when the fifth edge seal 405 is recessed inward, the fifth edge seal may easily touch the intersection point A of the first electrode plate 421 located in the virtual circular arc region S such that the fifth edge seal 405 is punctured by the sharpest intersection point A. In order to prevent the fifth edge seal 405 from touching the sharpest position of the first electrode plate 421 when being recessed inward, a manner of increasing a distance or gap between the intersection point A of the first electrode plate 421 and the fifth edge seal 405 may be adopted to avoid the touching between them, but this undoubtedly reduces the space utilization ratio and energy density of the battery cell 40. According to the embodiment shown in the FIG. 4 of the present application, the sharpest part at the intersection point A of the first electrode plate 421 is removed to form the inwardly recessed fifth edge 421e, thereby eliminating the risk of the fifth edge seal 405 being punctured by the first electrode plate 421 when being recessed inward. Moreover, the point on the fifth edge 421e has the minimum distance $$L = \sqrt[2]{(R-D1)^2 + (R-D2)^2}$$

relative to the virtual intersection point A, so that even if the fifth edge seal 405 of the shell 400 is recessed inward by a distance of the radius R to the maximum extent, the fifth edge seal 405 only just touches the fifth edge 421e, thereby eliminating the risk of electrochemical corrosion caused by the fifth edge seal 405 of the shell 400 being subjected to a large degree of wear due to the fifth edge 421e. In addition, even if the range of the minimum distance L is greater than 0 and less than $$\sqrt[2]{(R-D1)^2 + (R-D2)^2},$$

since the fifth edge 421e of the first electrode plate 421 is in a circular arc shape recessed inward, even if the fifth edge seal 405 touches the fifth edge 421e when being recessed inward, the fifth edge seal will not be punctured by the first electrode plate 421, and due to the circular arc shape of the fifth edge 421e, the degree of wear of the fifth edge seal 405 of the shell 400 and the fifth edge 421e is also significantly reduced, thereby reducing the risk of electrochemical corrosion of the fifth edge seal 405 of the shell 400.

Figure 5:
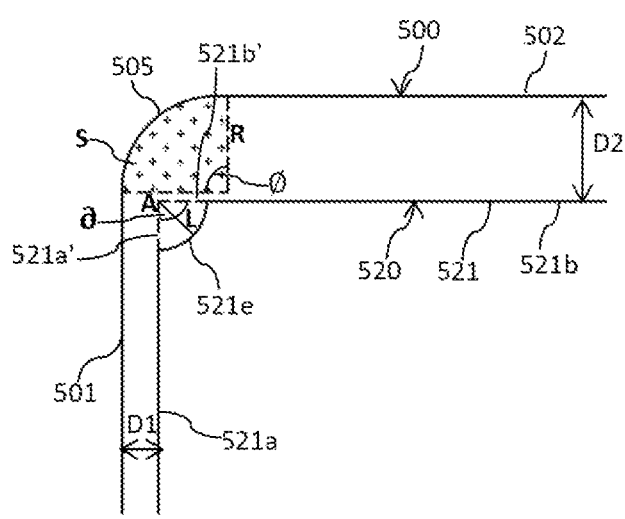
FIG. 5 shows a partial top schematic diagram of a battery cell according to another embodiment of the present application, wherein the position of the part shown in the partial top schematic diagram in the battery cell shown in FIG. 5 is the same as the position of part A-A in FIG. 1.

FIG. 5 shows a partial top schematic diagram of a battery cell 50 according to another embodiment of the present application, wherein the position of the part shown in the partial top schematic diagram in the battery cell 50 shown in FIG. 5 is the same as the position of part A-A in FIG. 1. It should be noted that for the sake of simplicity, the complete structural schematic diagram of the battery cell 50 of FIG. 5 is not shown. However, persons skilled in the art may understand that the battery cell 50 of FIG. 5 not shown may have the same composition as the battery cell 10 of FIG. 1.

A fifth edge seal 505 of a shell 500 is a circular arc with a radius R, and defines a virtual circular arc region S with a radius R and a radian angle Ø=90 degrees. A first edge 521a of a first electrode plate 521 has a virtual extension line 521a', a second edge 521b of the first electrode plate 521 has a virtual extension line 521b', the virtual extension line 521a' and the virtual extension line 521b' intersect to form a virtual intersection point A, and the virtual intersection point A is located outside the virtual circular arc region S. The virtual extension line 521a' of the first edge 521a and the virtual extension line 521b' of the second edge 521b form a corner ∂ at the virtual intersection point A toward a fifth edge 521e of the first electrode plate 521, and the corner ∂=90 degrees. In other embodiments of the present application, the angle of the corner ∂ is greater than 0 degrees and less than 180 degrees. The fifth edge 521e is a circular arc, a point on the fifth edge 521e has a minimum distance L relative to the virtual intersection point A, and the minimum distance L is D1, wherein D1 is a vertical distance from the first edge 521a of the first electrode plate 521 to a first edge seal 501 of the shell 500, D2 is a vertical distance from the second edge 521b of the first electrode plate 521 to a second edge seal 502 of the shell 500, and D1 is less than D2. In other embodiments of the present application, the minimum distance L is L2, and L2 is equal to the smaller one of D1 and D2.

Since the intersection point A of the virtual extension line 521a' of the first edge 521a of the first electrode plate 521 and the virtual extension line 521b' of the second edge 521b of the first electrode plate 521 is outside the virtual circular arc region S of the battery cell 50, during actual use of the battery, the possibility of severe wear of the first electrode plate 521 and the fifth edge seal 505 of the battery cell 50 is small. In view of such a situation, it is only required to meet the basic requirement that the battery cell 50 is prevented from being punctured due to the expansion of the first electrode plate 521 during use. Therefore, in the embodiment shown in FIG. 5 of the present application, the basic requirement that the battery cell 50 is prevented from being punctured due to the expansion of the first electrode plate 521 is meet by designing the minimum distance from the virtual intersection point A to the point on the fifth edge 521e of the first electrode plate 521 to be the smaller one of D1 and D2, thereby improving the safety performance of the battery cell 50 while ensuring the high space utilization ratio and energy density.

Figure 6:
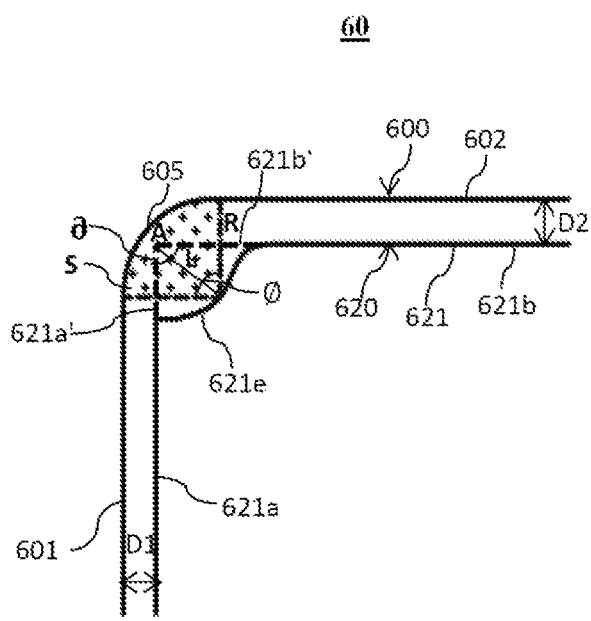
FIG. 6 shows a partial top schematic diagram of a battery cell according to still another embodiment of the present application, wherein the position of the part shown in the partial top schematic diagram in the battery cell shown in FIG. 6 is the same as the position of part A-A in FIG. 1.

FIG. 6 shows a partial top schematic diagram of a battery cell 60 according to still another embodiment of the present application, wherein the position of the part shown in the partial top schematic diagram in the battery cell shown in FIG. 6 is the same as the position of part A-A in FIG. 1. It should be noted that for the sake of simplicity, the complete structural schematic diagram of the battery cell 60 of FIG. 6 is not shown. However, persons skilled in the art may understand that the battery cell 60 of FIG. 6 not shown may have the same composition as the battery cell 10 of FIG. 1.

A fifth edge seal 605 of a shell 600 is a circular arc with a radius R, and defines a virtual circular arc region S with a radius R and a radian angle Ø=90 degrees. A first edge 621a of a first electrode plate 621 has a virtual extension line 621a', a second edge 621b of the first electrode plate 621 has a virtual extension line 621b', the virtual extension line 621a' and the virtual extension line 621b' intersect to form a virtual intersection point A, and the virtual intersection point A is located in the virtual circular arc region S. The virtual extension line 621a' of the first edge 621a and the virtual extension line 621b' of the second edge 621b form a corner ∂ at the virtual intersection point A toward the fifth edge 621e, and the corner ∂=90 degrees. In other embodiments of the present application, the angle of the corner ∂ is greater than 0 degrees and less than 180 degrees. The fifth edge 621e is an irregular curve, a point on the fifth edge 621e has a minimum distance L relative to the virtual intersection point A, and the minimum distance L is $$\sqrt[2]{(R-D1)^2 + (R-D2)^2},$$

wherein D1 is a vertical distance from the first edge 621a of the first electrode plate 621 of an electrode assembly 620 to a first edge seal 601 of the shell 600, and D2 is a vertical distance from the first edge 621b of the first electrode plate 621 of the electrode assembly 620 to a second edge seal 602 of the shell 600.

If the shape of the first electrode plate 621 is not specially designed here, when the fifth edge seal 605 is recessed inward, the fifth edge seal may easily touch the intersection point A of the first electrode plate 621 located in the virtual circular arc region S such that the fifth edge seal 605 is punctured by the sharpest intersection point A. In order to prevent the fifth edge seal 605 from touching the sharpest position of the first electrode plate 621 when being recessed inward, a manner of increasing a distance or gap between the intersection point A of the first electrode plate 621 and the fifth edge seal 605 may be adopted to avoid the touching between them, but this undoubtedly reduces the space utilization ratio and energy density of the battery cell 60. According to the embodiment shown in the FIG. 6 of the present application, the sharpest part at the intersection point A of the first electrode plate 621 is removed to form the inwardly recessed fifth edge 621e, thereby eliminating the risk of the fifth edge seal 605 being punctured by the first electrode plate 621 when being recessed inward. Moreover, the point on the fifth edge 621e has the minimum distance $$L = \sqrt[2]{(R-D1)^2 + (R-D2)^2}$$

relative to the virtual intersection point A, so that even if the fifth edge seal 605 of the shell 600 is recessed inward by a distance of the radius R to the maximum extent, the fifth edge seal 605 only just touches the fifth edge 621e, thereby eliminating the risk of electrochemical corrosion caused by the fifth edge seal 605 of the shell 600 being subjected to a large degree of wear due to the fifth edge 621e. In addition, even if the range of the minimum distance L is greater than 0 and less than $$\sqrt[2]{(R-D1)^2 + (R-D2)^2},$$

since the fifth edge 621e of the first electrode plate 621 is an irregular curve recessed inward, even if the fifth edge seal 605 touches the fifth edge 621e when being recessed inward, the fifth edge seal 605 will not be punctured by the first electrode plate 621, and since the fifth edge 621e is the irregular curve recessed inward, the degree of wear of the fifth edge seal 605 of the shell 600 and the fifth edge 621e is also significantly reduced, thereby reducing the risk of electrochemical corrosion of the fifth edge seal 605 of the shell 600.

Figure 7:
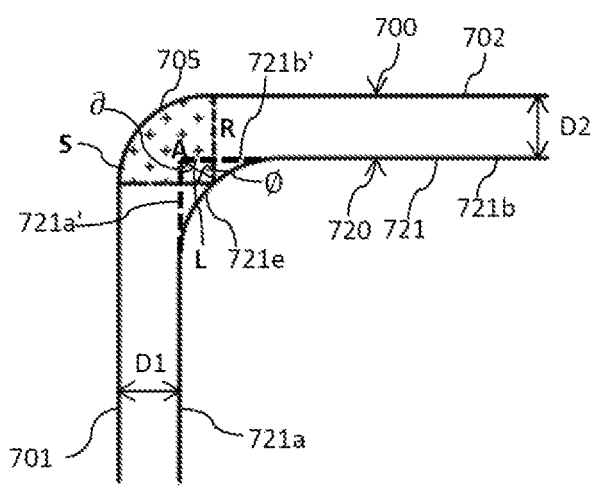
FIG. 7 shows a partial top schematic diagram of a battery cell according to another embodiment of the present application, wherein the position of the part shown in the partial top schematic diagram in the battery cell shown in FIG. 7 is the same as the position of part A-A in FIG. 1.

FIG. 7 shows a partial top schematic diagram of a battery cell 70 according to another embodiment of the present application, wherein the position of the part shown in the partial top schematic diagram in the battery cell 70 shown in FIG. 7 is the same as the position of part A-A in FIG. 1. It should be noted that for the sake of simplicity, the complete structural schematic diagram of the battery cell 70 of FIG. 7 is not shown. However, persons skilled in the art may understand that the battery cell 70 of FIG. 7 not shown may have the same composition as the battery cell 10 of FIG. 1.

A fifth edge seal 705 of a shell 700 is a circular arc with a radius R, and defines a virtual circular arc region S with a radius R and a radian angle Ø=90 degrees. A first edge 721a of a first electrode plate 721 has a virtual extension line 721a', a second edge 721b of the first electrode plate 721 has a virtual extension line 721b', the virtual extension line 721a' and the virtual extension line 721b' intersect to form a virtual intersection point A, and the virtual intersection point A is located in the virtual circular arc region S. The virtual extension line 721a' of the first edge 721a and the virtual extension line 721b' of the second edge 721b form a corner ∂ at the virtual intersection point A toward the fifth edge 721e, and the corner ∂=90 degrees. In other embodiments of the present application, the angle of the corner ∂ is greater than 0 degrees and less than 180 degrees. The fifth edge 721e is a circular arc with a radius greater than R, and is convex toward the fifth edge seal 705. A point on the fifth edge 721e has a minimum distance L relative to the virtual intersection point A, and L is greater than 0. In another embodiment of the present application, L is equal to $$\sqrt[2]{(R-D1)^2 + (R-D2)^2},$$

wherein D1 is a vertical distance from the first edge 721a of the first electrode plate 721 of an electrode assembly 720 to a first edge seal 701 of the shell 700, and D2 is a vertical distance from the first edge 721b of the first electrode plate 721 of the electrode assembly 720 to a second edge seal 702 of the shell 700. In still another embodiment of the present application, the minimum distance L is greater than 0 and less than $$\sqrt[2]{(R-D1)^2 + (R-D2)^2}.$$

If the shape of the first electrode plate 721 is not specially designed here, when the fifth edge seal 705 is recessed inward, the fifth edge seal may easily touch the intersection point A of the first electrode plate 721 located in the virtual circular arc region S such that the fifth edge seal 705 is punctured by the sharpest intersection point A. In order to prevent the fifth edge seal 705 from touching the sharpest position of the first electrode plate 721 when being recessed inward, a manner of increasing a distance or gap between the intersection point A of the first electrode plate 721 and the fifth edge seal 705 may be adopted to avoid the touching between them, but this undoubtedly reduces the space utilization ratio and energy density of the battery cell 70. According to the embodiment shown in the FIG. 7 of the present application, the sharpest part at the intersection point A of the first electrode plate 721 is removed to form the fifth edge 721e, thereby eliminating the risk of the fifth edge seal 705 being punctured by the first electrode plate 721 when being recessed inward. Moreover, since the fifth edge 721e is the circular arc with the radius greater than R, and is convex toward the fifth edge seal 705, even if the fifth edge seal 705 touches the fifth edge 721e when being recessed inward, the fifth edge seal 705 will not be punctured by the fifth edge 721e, and no great degree of wear will occur between them, thereby reducing the risk of electrochemical corrosion of the fifth edge seal 705 of the shell 700. In addition, since the fifth edge 721e is the circular arc with the radius greater than R and is convex toward the fifth edge seal 705, the minimum distance L may be set to a value greater than 0 and less than or equal to $$\sqrt[2]{(R-D1)^2 + (R-D2)^2},$$

thereby ensuring or improving the space utilization ratio and energy density of the battery cell 70 while reducing the risk of electrochemical corrosion of the fifth edge seal 705.

Figure 8:
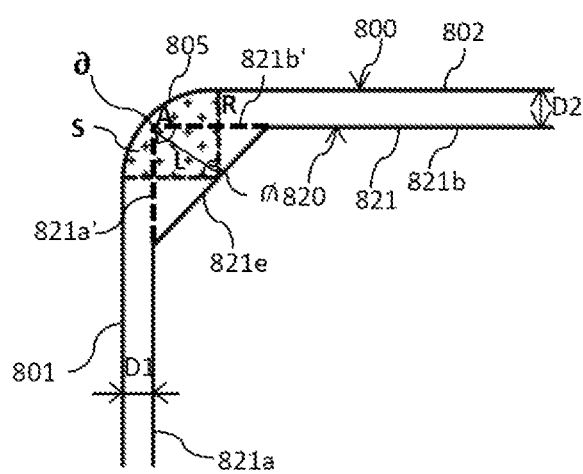
FIG. 8 shows a partial top schematic diagram of a battery cell according to still another embodiment of the present application, wherein the position of the part shown in the partial top schematic diagram in the battery cell shown in FIG. 8 is the same as the position of part A-A in FIG. 1.

FIG. 8 shows a partial top schematic diagram of a battery cell 80 according to still another embodiment of the present application, wherein the position of the part shown in the partial top schematic diagram in the battery cell 80 shown in FIG. 8 is the same as the position of part A-A in FIG. 1. It should be noted that for the sake of simplicity, the complete structural schematic diagram of the battery cell 80 of FIG. 8 is not shown. However, persons skilled in the art may understand that the battery cell 80 of FIG. 8 not shown may have the same composition as the battery cell 10 of FIG. 1.

A fifth edge seal 805 of a shell 800 is a circular arc with a radius R, and defines a virtual circular arc region S with a radius R and a radian angle Ø=90 degrees. A first edge 821a of a first electrode plate 821 has a virtual extension line 821a', a second edge 821b of the first electrode plate 821 has a virtual extension line 821b', the virtual extension line 821a' and the virtual extension line 821b' intersect to form a virtual intersection point A, and the virtual intersection point A is located in the virtual circular arc region S. The virtual extension line 821a' of the first edge 821a and the virtual extension line 821b' of the second edge 821b form a corner ∂ at the virtual intersection point A toward the fifth edge 821e, and the corner ∂=90 degrees. In other embodiments of the present application, the angle of the corner ∂ is greater than 0 degrees and less than 180 degrees. The fifth edge 821e is a straight line, a point on the fifth edge 821e has a minimum distance L relative to the virtual intersection point A, and L is greater than 0. In another embodiment of the present application, the minimum distance L is equal to $$\sqrt[2]{(R-D1)^2 + (R-D2)^2},$$

wherein D1 is a vertical distance from the first edge 821a of the first electrode plate 821 of an electrode assembly 820 to a first edge seal 801 of the shell 800, and D2 is a vertical distance from the first edge 821b of the first electrode plate 821 of the electrode assembly 820 to a second edge seal 802 of the shell 800. In still another embodiment of the present application, the minimum distance L is greater than 0 and less than $$\sqrt[2]{(R-D1)^2 + (R-D2)^2}.$$

If the shape of the first electrode plate 821 is not specially designed here, when the fifth edge seal 805 is recessed inward, the fifth edge seal may easily touch the intersection point A of the first electrode plate 821 located in the virtual circular arc region S such that the fifth edge seal 805 is punctured by the sharpest intersection point A. In order to prevent the fifth edge seal 805 from touching the sharpest position of the first electrode plate 821 when being recessed inward, a manner of increasing a distance or gap between the intersection point A of the first electrode plate 821 and the fifth edge seal 805 may be adopted to avoid the touch between them, but this undoubtedly reduces the space utilization ratio and energy density of the battery cell 80. According to the embodiment shown in the FIG. 8 of the present application, the sharpest part at the intersection point A of the first electrode plate 821 is removed to form the fifth edge 821e, thereby eliminating the risk of the fifth edge seal 805 being punctured by the first electrode plate 821 when being recessed inward. Moreover, since the fifth edge 821e is the straight line, even if the fifth edge seal 805 touches the fifth edge 821e when being recessed inward, the fifth edge seal 805 will not be punctured by the fifth edge 821e, and no great degree of wear will occur between them, thereby reducing the risk of electrochemical corrosion of the fifth edge seal 805 of the shell 800. In addition, the minimum distance L may be set to a value greater than 0 and less than or equal to $$\sqrt[2]{(R-D1)^2 + (R-D2)^2},$$

thereby ensuring or improving the space utilization ratio and energy density of the battery cell 80 while reducing the risk of electrochemical corrosion of the fifth edge seal 805.

Figure 9:
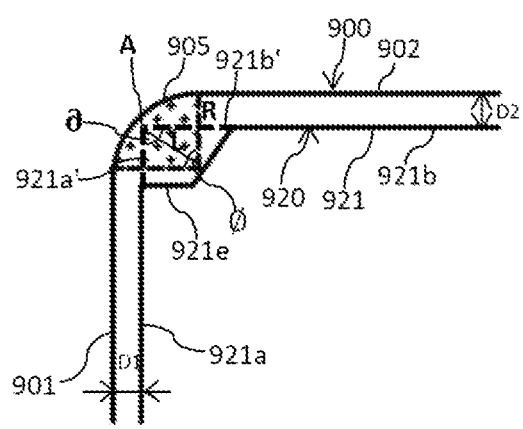
FIG. 9 shows a partial top schematic diagram of a battery cell according to another embodiment of the present application, wherein the position of the part shown in the partial top schematic diagram in the battery cell shown in FIG. 9 is the same as the position of part A-A in FIG. 1.

FIG. 9 shows a partial top schematic diagram of a battery cell 90 according to another embodiment of the present application, wherein the position of the part shown in the partial top schematic diagram in the battery cell 90 shown in FIG. 9 is the same as the position of part A-A in FIG. 1. It should be noted that for the sake of simplicity, the complete structural schematic diagram of the battery cell 90 of FIG. 9 is not shown. However, persons skilled in the art may understand that the battery cell 90 of FIG. 9 not shown may have the same composition as the battery cell 10 of FIG. 1.

A fifth edge seal 905 of a shell 900 is a circular arc with a radius R, and defines a virtual circular arc region S with a radius R and a radian angle Ø=90 degrees. A first edge 921a of a first electrode plate 921 has a virtual extension line 921a', a second edge 921b of the first electrode plate 921 has a virtual extension line 921b', the virtual extension line 921a' and the virtual extension line 921b' intersect to form a virtual intersection point A, and the virtual intersection point A is located in the virtual circular arc region S. The virtual extension line 921a' of the first edge 921a and the virtual extension line 921b' of the second edge 921b form a corner ∂ at the virtual intersection point A toward a fifth edge 921e of the first electrode plate 921, and the corner ∂=90 degrees. In other embodiments of the present application, the angle of the corner ∂ is greater than 0 degrees and less than 180 degrees. The fifth edge 921e is composed of a plurality of straight lines, a point on the fifth edge 921e has a minimum distance L relative to the virtual intersection point A, and L is greater than 0. In another embodiment of the present application, the minimum distance L is equal to $$\sqrt[2]{(R-D1)^2 + (R-D2)^2},$$

wherein D1 is a vertical distance from the first edge 921a of the first electrode plate 921 of an electrode assembly 920 to a first edge seal 901 of the shell 900, and D2 is a vertical distance from the second edge 921b of the first electrode plate 921 of the electrode assembly 920 to a second edge plate 902 of the shell 900. In still another embodiment of the present application, the minimum distance L is greater than 0 and less than $$\sqrt[2]{(R-D1)^2 + (R-D2)^2}.$$

If the shape of the first electrode plate 921 is not specially designed here, when the fifth edge seal 905 is recessed inward, the fifth edge seal may easily touch the intersection point A of the first electrode plate 921 located in the virtual circular arc region S such that the fifth edge seal 905 is punctured by the sharpest intersection point A. In order to prevent the fifth edge seal 905 from touching the sharpest position of the first electrode plate 921 when being recessed inward, a manner of increasing a distance or gap between the intersection point A of the first electrode plate 921 and the fifth edge seal 905 may be adopted to avoid the touch between them, but this undoubtedly reduces the space utilization ratio and energy density of the battery cell 90. According to the embodiment shown in the FIG. 9 of the present application, the sharpest part at the intersection point A of the first electrode plate 921 is removed to form the fifth edge 921e, thereby eliminating the risk of the fifth edge seal 905 being punctured by the first electrode plate 921 when being recessed inward. Besides, since the fifth edge 921e is the straight lines, even if the fifth edge seal 905 touches the fifth edge 921e when being recessed inward, the fifth edge seal 905 will not be punctured by the fifth edge 921e, and no great degree of wear will occur between them, thereby reducing the risk of electrochemical corrosion of the fifth edge seal 905 of the shell 900. In addition, the minimum distance L may be set to a value greater than 0 and less than or equal to $$\sqrt[2]{(R-D1)^2 + (R-D2)^2},$$

thereby ensuring or improving the space utilization ratio and energy density of the battery cell 90 while reducing the risk of electrochemical corrosion of the fifth edge seal 905.

Figure 10:
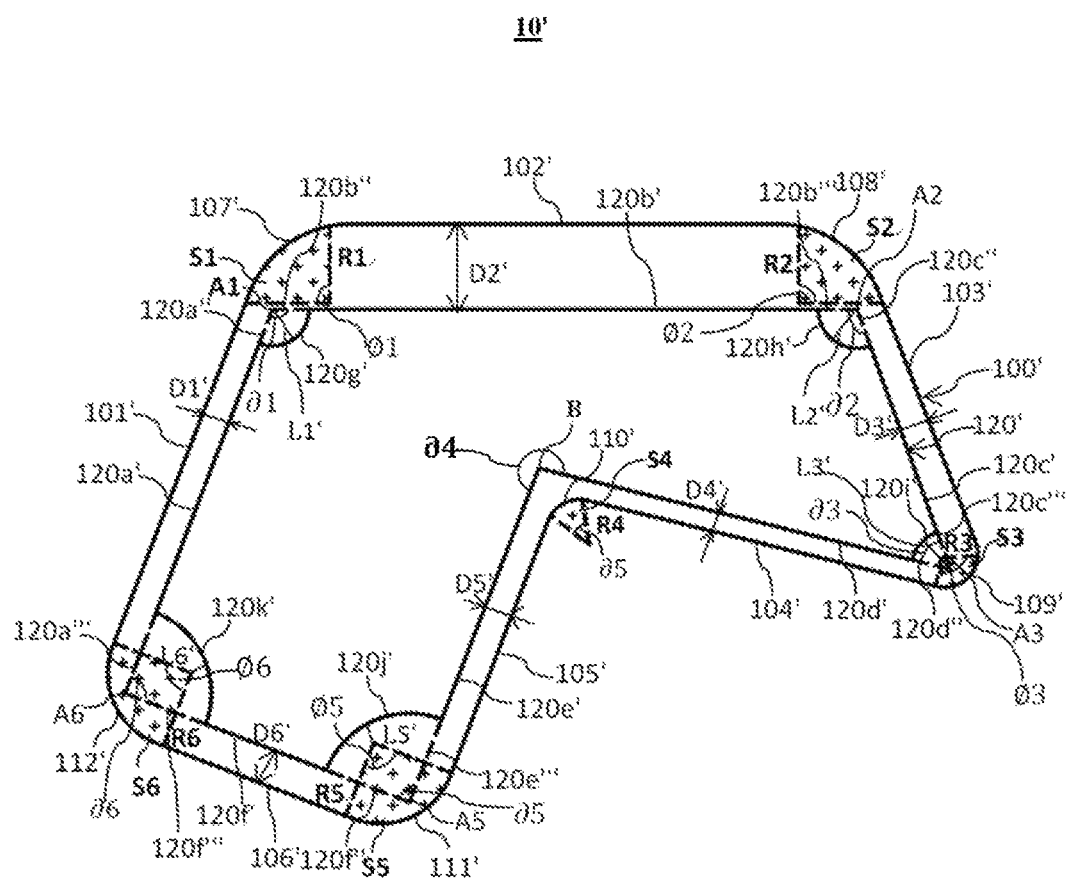
FIG. 10 shows a partial top schematic diagram of a battery cell according to still another embodiment of the present application.

FIG. 10 shows a partial top schematic diagram of a battery cell 10' according to still another embodiment of the present application. As shown in FIG. 10, the battery cell 10' according to an embodiment of the present application includes: a shell 100' and an electrode plate 120'. The shell 100' receives the electrode plate 120'.

The shell 100' includes a first edge seal 101', a second edge seal 102', a third edge seal 103', a fourth edge seal 104', a fifth edge seal 105', and a sixth edge seal 106'; and a seventh edge seal 107' connecting the first edge seal 101' and the second edge seal 102', an eighth edge seal 108' connecting the second edge seal 102' and the third edge seal 103', a ninth edge seal 109' connecting the third edge seal 103' and the fourth edge seal 104', a tenth edge seal 110' connecting the fourth edge seal 104' and the fifth edge seal 105', an eleventh edge seal 111' connecting the fifth edge seal 105' and the sixth edge seal 106 ', and a twelfth edge seal 112' connecting the sixth edge seal 106' and the first edge seal 101'.

The seventh edge seal 107', the eighth edge seal 108', the ninth edge seal 109', the tenth edge seal 110', the eleventh edge seal 111', and the twelfth edge seal 112' are circular arcs respectively with radiuses R1, R2, R3, R4, R5, and R6, and respectively define virtual circular arc regions S1, S2, S3, S4, S5, and S6 with radiuses R1, R2, R3, R4, R5, and R6 and radians $Ø1=90$ degrees, $Ø2=90$ degrees, $Ø3=120$ degrees, $Ø4=30$ degrees, $Ø5=90$ degrees, and $Ø6=90$ degrees respectively. In another embodiment of the present application, one or more of the seventh edge seal 107', the eighth edge seal 108', the ninth edge seal 109', the tenth edge seal 110', the eleventh edge seal 111', and the twelfth edge seal 112' have different sizes and shapes. In still another embodiment of the present application, one or more of the seventh edge seal 107', the eighth edge seal 108', the ninth edge seal 109', the tenth edge seal 110', the eleventh edge seal 111', and the twelfth edge seal 112' have the same size and shape.

The shell 100' is an aluminum-plastic film. In another embodiment of the present application, the shell 100' is any suitable battery shell material. In still another embodiment of the present application, the shell 100' is any suitable soft pack battery shell material.

The shell 100' is subjected to a punch process such that the shell 100' has an inner space to receive the electrode assembly 120'. At the same time, the seventh edge seal 107', the eighth edge seal 108', the ninth edge seal 109', the tenth edge seal 110', the eleventh edge seal 111', and the twelfth edge seal 112' with the radiuses R1, R2, R3, R4, R5, and R6 are formed by the punch process. Persons skilled in the art may set specific values of the radiuses and the radians of the seventh edge seal 107', the eighth edge seal 108', the ninth edge seal 109', the tenth edge seal 110', the eleventh edge seal 111', and the twelfth edge seal 112' according to the specific size and/or shape of the shell 100' and/or the electrode assembly 120'.

In other embodiments of the present application, the battery cell 10' includes any number of electrode plates, and isolation films are disposed between the plurality of electrode plates. The isolation films are configured to fit the shapes of the plurality of electrode plates, and extend beyond edges of the electrode plates. The material of the isolation films is an isolation film material commonly used in the art, such as, but not limited to, polyterephthalic acid and polypropylene.

The material of the electrode plate 120' is an electrode material commonly used in the art. The electrode plate 120' has a first edge 120a', a second edge 120b', a third edge 120c', a fourth edge 120d', a fifth edge 120e', and a sixth edge 120f.

The electrode plate 120' further has a seventh edge 120g' connecting the first edge 120a' and the second edge 120b', an eighth edge 120h' connecting the second edge 120b' and the third edge 120c', a ninth edge 120i' connecting the third edge 120c' and the fourth edge 120d', a tenth edge 120j' connecting the fifth edge 120e' and the sixth edge 120f, and an eleventh edge 120k' connecting the sixth edge 120f and the first edge 120a'.

The seventh edge seal 107' defines a virtual circular arc region S1 with a radius R1 and a radian angle $Ø1=90$ degrees. The first edge 120a' of the electrode plate 120' has a virtual extension line 120a", the second edge 120b' of the electrode plate 120' has a virtual extension line 121b", the virtual extension line 121a" and the virtual extension line 121b" intersect to form a virtual intersection point A1, and the virtual intersection point A1 is located outside the virtual circular arc region S1. The virtual extension line 121a" of the first edge 121a' and the virtual extension line 121b" of the second edge 120b' form a corner $\partial 1$ at the virtual intersection point A1 toward the seventh edge 120g', and the corner $\partial 1=120$ degrees. The seventh edge 120g' is a circular arc, a point on the seventh edge 120g' has a minimum distance L1' relative to the virtual intersection point A1, and L1'=D1', wherein D1' is a vertical distance from the first edge 120a' to the first edge seal 101', D2' is a vertical distance from the second edge 120b' to the second edge seal 102', and D1' is less than D2'. In other embodiments of the present application, the minimum distance L1' is equal to the smaller one of D1' and D2'.

The seventh edge seal 108' defines a virtual circular arc region S2 with a radius R2 and a radian angle $Ø2=90$ degrees. The second edge 120b' of the electrode plate 120' has a virtual extension line 121b''', the third edge 120c' of the electrode plate 120' has a virtual extension line 121c", the virtual extension line 121b''' and the virtual extension line 121c" intersect to form a virtual intersection point A2, and the virtual intersection point A2 is located outside the virtual circular arc region S2. The virtual extension line 121b''' of the second edge 120b' and the virtual extension line 121c" of the third edge 120c' form a corner $\partial 2$ at the virtual intersection point A2 toward the eighth edge 120h', and the corner $\partial 2=120$ degrees. The eighth edge 120h' is a circular arc, a point on the eighth edge 120h' has a minimum distance L2' relative to the virtual intersection point A2, and L2'=D3', wherein D3' is a vertical distance from the third edge 120c' to the third edge seal 103', D2' is a vertical distance from the second edge 120b' to the second edge seal 102', and D3' is less than D2'. In other embodiments of the present application, the minimum distance L2' is equal to the smaller one of D3' and D2'.

The ninth edge seal 109' defines a virtual circular arc region S3 with a radius R3 and a radian angle $Ø3=120$ degrees. The third edge 120c' of the electrode plate 120' has a virtual extension line 121c''', the fourth edge 120d' of the electrode plate 120' has a virtual extension line 120d", the virtual extension line 121c''' and the virtual extension line 120d" intersect to form a virtual intersection point A3, and the virtual intersection point A3 is located in the virtual circular arc region S3. The virtual extension line 121c''' of the third edge 120c' and the virtual extension line 120d" of the fourth edge 120d' form a corner $\partial 3$ at the virtual intersection point A3 toward the ninth edge 120i', and the corner $\partial 3=30$ degrees. A point on the ninth edge 120i' has a minimum distance $$L3 = \sqrt[2]{(R3 - D3')^2 + (R3 - D4')^2}$$

relative to the virtual intersection point A3, wherein D3' is a vertical distance from the third edge 120c' of the electrode plate 120' to the third edge seal 103' of the shell 100', and D4' is a vertical distance from the fourth edge 120d' of the electrode plate 120' to the fourth edge seal 104' of the shell 100'.

The fourth edge 120d' of the electrode plate 120' and the fifth edge 120e' of the electrode plate 120' intersect at an intersection point B near the tenth edge seal 110', and form a corner ∂4 at the intersection point B, and the corner ∂4=270 degrees. At this time, there is no wear relationship between the intersection point B and the tenth edge seal 110', and therefore, there is no need to perform special treatment on the fifth edge 120e' and the fourth edge 120d' of the electrode plate 120'.

The eleventh edge seal 111' defines a virtual circular arc region S5 with a radius R5 and a radian angle Ø5=90 degrees. The fifth edge 120e' of the electrode plate 120' has a virtual extension line 120e''', the sixth edge 120f of the electrode plate 120' has a virtual extension line 120f', the virtual extension line 120e''' and the virtual extension line 120f intersect to form a virtual intersection point A5, and the virtual intersection point A5 is located in the virtual circular arc region S5. The virtual extension line 120e''' of the fifth edge 120e' and the virtual extension line 120f' of the sixth edge 120f form a corner ∂5 at the virtual intersection point A5, and the corner ∂5=90 degrees. A point on the tenth edge 120j' has a minimum distance $$L5' = \sqrt[2]{(R5 - D5')^2 + (R5 - D6')^2}$$

relative to the virtual intersection point A5, wherein D6' is a vertical distance from the sixth edge 120f of the electrode plate 120' to the sixth edge seal 106' of the shell 100', and D5' is a vertical distance from the fifth edge 120e' of the electrode plate 120' to the fifth edge seal 105' of the shell 100'.

The twelfth edge seal 112' defines a virtual circular arc region S6 with a radius R6 and a radian angle Ø6=90 degrees. The sixth edge 120f of the electrode plate 120' has a virtual extension line 120f''', the first edge 120a' of the electrode plate 120' has a virtual extension line 120a''', the virtual extension line 120f''' and the virtual extension line 120a''' intersect to form a virtual intersection point A6, and the virtual intersection point A6 is located in the virtual circular arc region S6. The virtual extension line 120f''' of the sixth edge 120f and the virtual extension line 120a''' of the first edge 120a' form a corner ∂6 at the virtual intersection point A6, and the corner ∂6=90 degrees. A point on the eleventh edge 120k' has a minimum distance $$L6' = \sqrt[2]{(R6 - D6')^2 + (R6 - D1')^2}$$

relative to the virtual intersection point A6, wherein D6' is a vertical distance from the sixth edge 120f of the electrode plate 120' to the sixth edge seal 106' of the shell 100', and D1' is a vertical distance from the first edge 120a' of the electrode plate 120' to the first edge seal 102a' of the shell 100'.

An embodiment of the present application further provides an electronic device, which may include one or more of the battery cells according to the embodiments of the present application.

Technical content and technical features of the present application are disclosed above. However, persons skilled in the art may still make replacements and modifications based on the teachings and the disclosure of the present application without departing from the spirit of the present application. Therefore, the protection scope of the present application should not be limited to the content disclosed in the embodiments, and should include various replacements and modifications without departing from the present application, and is covered by the claims of the present application.

What is claimed is:

1. A battery cell, comprising:
   an electrode assembly, including an electrode plate; and
   a shell, receiving the electrode assembly and including a first edge seal, a second edge seal and a circular edge seal connecting the first edge seal and the second edge seal, wherein the circular edge seal defines a virtual circular arc region with a radius R and a radian angle Ø, wherein,
   the electrode plate has a first edge, a second edge and a third edge connecting the first edge and the second edge, and a virtual extension line of the first edge and a virtual extension line of the second edge intersect to form a virtual intersection point A;
   a point on the third edge has a minimum distance L relative to the virtual intersection point A; and
   the virtual extension line of the first edge and the virtual extension line of the second edge form a corner at the virtual intersection point A toward the third edge, and an angle of the corner is greater than 0 degrees and less than 180 degrees,
   wherein the virtual intersection point A is located in the virtual circular arc region, and the minimum distance L is $$\sqrt[2]{(R - D1)^2 + (R - D2)^2},$$

wherein D1 is a vertical distance from the first edge to the first edge seal, and D2 is a vertical distance from the second edge to the second edge seal, or the virtual intersection point A is located outside the virtual circular arc region, a vertical distance from the first edge to the first edge seal is D1, and a vertical distance from the second edge to the second edge seal is D2; and a minimum distance from the virtual intersection point A to the third edge is L2, and L2 is equal to the smaller one of D1 and D2.

2. The battery cell according to claim 1, wherein the third edge comprises a circular arc, a straight line or an irregular curve.

3. The battery cell according to claim 1, wherein the third edge is a circular arc with a radius greater than R, and the third edge is convex toward the circular edge seal.

4. The battery cell according to claim 1, wherein an angle of the radian angle Ø is greater than or equal to 0 degrees and less than or equal to 180 degrees.

5. The battery cell according to claim 1, wherein an angle of the radian angle Ø is greater than or equal to 0 degrees and less than or equal to 90 degrees.

6. The battery cell according to claim 1, wherein the electrode plate comprises a first electrode plate and a second electrode plate; and a separator is disposed between the first electrode plate and the second electrode plate.

7. The battery cell according to claim 6, wherein the separator is configured to fit a shape of the electrode plate, and the separator extends beyond edges of the electrode plate.

8. An electronic device, comprising a battery cell, the battery cell comprises:

an electrode assembly, including an electrode plate; and a shell, receiving the electrode assembly and including a first edge seal, a second edge seal and a circular edge seal connecting the first edge seal and the second edge seal, wherein the circular edge seal defines a virtual circular arc region with a radius R and a radian angle Ø, wherein, the electrode plate has a first edge, a second edge and a third edge connecting the first edge and the second edge, and a virtual extension line of the first edge and a virtual extension line of the second edge intersect to form a virtual intersection point A;

a point on the third edge has a minimum distance L relative to the virtual intersection point A; and the virtual extension line of the first edge and the virtual extension line of the second edge form a corner at the virtual intersection point A toward the third edge, and an angle of the corner is greater than 0 degrees and less than 180 degrees, wherein the virtual intersection point A is located in the virtual circular arc region, and the minimum distance L is $$\sqrt[2]{(R-D1)^2 + (R-D2)^2},$$

wherein D1 is a vertical distance from the first edge to the first edge seal, and D2 is a vertical distance from the second edge to the second edge seal, or the virtual intersection point A is located outside the virtual circular arc region, a vertical distance from the first edge to the first edge seal is D1, and a vertical distance from the second edge to the second edge seal is D2; and a minimum distance from the virtual intersection point A to the third edge is L2, and L2 is equal to the smaller one of D1 and D2.

9. The electronic device according to claim 8, wherein the third edge comprises a circular arc, a straight line or an irregular curve.

10. The electronic device according to claim 8, wherein the third edge is a circular arc with a radius greater than R, and the third edge is convex toward the circular edge seal.

11. The electronic device according to claim 8, wherein an angle of the radian angle Ø is greater than or equal to 0 degrees and less than or equal to 180 degrees.

12. The electronic device according to claim 8, wherein an angle of the radian angle Ø is greater than or equal to 0 degrees and less than or equal to 90 degrees.

13. The electronic device according to claim 8, wherein the electrode plate comprises a first electrode plate and a second electrode plate; and a separator is disposed between the first electrode plate and the second electrode plate.

14. The electronic device according to claim 13, wherein the separator is configured to fit a shape of the electrode plate, and the separator extends beyond edges of the electrode plate.

* * * * *